United States Patent [19]

Hanesworth et al.

[11] 4,215,206

[45] Jul. 29, 1980

[54] FURAN BINDER COMPOSITION

[75] Inventors: Richard F. Hanesworth, Delaware; Young D. Kim; Gary A. Tolhurst, both of Columbus, all of Ohio

[73] Assignee: Ashland Oil, Inc., Ashland, Ky.

[21] Appl. No.: 887,087

[22] Filed: Mar. 16, 1978

[51] Int. Cl.$^2$ ............................................. C08L 45/00
[52] U.S. Cl. .................................... 525/441; 164/43; 525/411; 525/442
[58] Field of Search ............. 260/829, DIG. 40, 40 R; 164/43; 525/411, 441, 442

[56] References Cited

U.S. PATENT DOCUMENTS

| 2,510,496 | 6/1950 | Garlin, Jr. .............................. 260/829 |
| 3,947,420 | 3/1976 | Bardet .......................... 260/DIG. 40 |

*Primary Examiner*—J. Ziegler
*Attorney, Agent, or Firm*—T. Gene Dillahunty; Vernon F. Venne

[57] ABSTRACT

Furan resin compositions containing aromatic polyester polyols exhibit improved performance as foundry hot box binders.

12 Claims, No Drawings

FURAN BINDER COMPOSITION

DESCRIPTION OF THE INVENTION

This invention generally relates to improved thermosetting resins and particularly relates to improved synthetic thermosetting resins by the addition of certain reactive polyols to enhance certain characteristics of the thermosetting resins.

Thermosetting resins are those resins cured by subjecting the resin to elevated temperature, either to initiate the cure or to cause curing of the resin. When used as binders to make foundry cores and molds, these thermosetting resins are referred to as "hot box binders". They are useful as foundry sand binders because the resin/sand mix is capable of being cured rapidly in heated patterns at temperatures of about 225° F. to about 500° F. In addition, foundry cores and molds can be made with such resins by baking at similar temperatures.

This invention particularly relates to the class of hot box binders known in the art as furan binders, which are those binders containing furfuryl alcohol. Such binders include furfuryl alcohol resins, furfuryl alcohol-formaldehyde resins, urea-formaldehyde-furfuryl alcohol resins, and phenol-formaldehyde-furfuryl alcohol resins. These binders are usually cured by application of heat and their cure may be accelerated by the presence of an acid catalyst curing agent such as $NH_4NO_3$, $NH_4Cl$, $FeCl_3$, HCl, $AlCl_3$, and other acids or acid salts generally known as latent catalysts in the foundry art. These binders are generally used in amounts of about 0.5% to about 5% by weight based on the weight of the sand.

An object of this invention is to provide an improved furan hot box binder. More particularly, an object of this invention is to provide a furan hot box binder which has improved strength properties, humidity resistance, and pattern release characteristics, as well as good shake-out properties.

The above objects and others are accomplished by incorporating in the furan binder an aromatic polyester polyol derived from polycarbomethoxy-substituted diphenyl, polyphenyl and benzyl esters of the toluate family. The aromatic polyester polyols generally useful in this invention are the higher molecular weight polyesters having relatively high viscosities. These polyesters can be prepared as the transesterification product of a dialkyl terephthalate and an aliphatic glycol, such as dimethyl terephthalate (DMT) and diethylene glycol or ethylene glycol. The preferred polyester is the transesterification product of DMT esterified oxidate residue and diethylene glycol. Such aromatic polyester polyols are available commercially from Hercules Incorporated under the trademark "TERATE" polyols, series 100, 200 and 300. For example, Terate 203 resin polyol is an aromatic polyester polyol typically having about 9% hydroxyl content, less than about 1% methoxyl content, an acid number of 4.2, a moisture content of about 0.2%, free diethylene glycol content of about 9%, an average functionality of 2.3 and viscosities of 30,000 cps at 25° C., 7,000 cps at 40° C. and 90 cps at 100° C.

The aromatic polyester polyol can be used with the furan binder as a cold blend, or it can be mixed with furfuryl alcohol, then blended with the furan binder. When desired, the aromatic polyester polyol may be prereacted to some extent with the furfuryl alcohol or the furan binder, or both. The aromatic polyester polyol may be used in amounts up to about 30% by weight based on the furan resin. The preferred amount of aromatic polyester polyol is from about 2% to about 10%.

The use of the aromatic polyester polyol with furan binders according to this invention results in a significant increase in core strength, as illustrated by the following examples.

EXAMPLE 1

To a three liter reaction flask equipped with a condenser 119 grams of methanol, 253 grams of urea, 0.5 grams of caustic solution (50% NaOH), and 324 grams of paraformaldehyde (91%) were charged. The mixture was then heated to 90° C. and the pH of the mixture was about 7.5 to 8.0. After all paraformaldehyde went into solution, the mixture was acidified to a pH of about 5.0 to 5.5 with acetic acid (30%). The reaction was continued at 90° to 95° C. until viscosity reached about 4.5 to 5.0 stokes, then 300 grams of furfuryl alcohol was added and mixed for 15 minutes. The reaction mixture was cooled and 0.15% (by weight based on weight of the reaction mixture) silane (A1120 from Union Carbide) was added.

EXAMPLE 2

The resin of Example 1 was used as a foundry hot box binder to form standard dog bone specimens for tensile strength tests. The pattern temperature was 425° to 450° F. A catalyst comprising a mixture of 39.1 parts of 50% $NH_4NO_3$, 21.1 parts water, 38.5 parts urea, 0.8 parts $NH_4OH$, and 0.5 parts silane (A1120, Union Carbide) was added to the sand, mixed for 2 minutes, then resin was added and mixed for 2 additional minutes.

| TEST NO. | 1 | 2 | 3 | 4 |
|---|---|---|---|---|
| Wedron 5010 Sand (parts by wt) | 100 | 100 | 100 | 100 |
| Catalyst (parts by weight based on 100 parts resin) | 20 | 20 | 20 | 20 |
| Resin (parts by weight based on weight of sand) | 1.85 | 1.85 | 1.85 | 1.85 |
| Content by wt% | 100% resin | 95% resin 5% diethylene glycol | 70% resin 25% furfuryl alcohol 5% 50/50 blend of furfuryl alcohol and Terate 203 | 95% resin 5% Terate 203 |
| Hot Tensile Strength Dwell Time in Seconds | | | | |
| 10 | — | 10 | 38 | 43 |
| 20 | — | 43 | 73 | 78 |
| 30 | 72 | 70 | 88 | 95 |
| 40 | 115 | 95 | 110 | 145 |
| 60 | 185 | 170 | 238 | 260 |

-continued

| TEST NO. | 1 | 2 | 3 | 4 |
|---|---|---|---|---|
| Tensile Strength | | | | |
| 30 Second Dwell, 5 Minute Cool | 245 | 307 | 415 | 383 |
| Cold Tensile Strengths | | | | |
| Dwell Time in Seconds | | | | |
| 5 | | 438 | 338 | 290 | 327 |
| 10 | | 298 | 523 | 563 | 565 |
| 20 | | 325 | 500 | 673 | 503 |
| 30 | | 310 | 455 | 557 | 518 |
| 40 | | 315 | 360 | 510 | 357 |
| 50 | | 240 | 368 | 472 | 338 |
| 60 | | 285 | 345 | 378 | 360 |

| TEST NO. | 1 | 2 | 3 | 4 |
|---|---|---|---|---|
| Tensile Strength 30 Second Dwell, 5 Minute Cool | 245 | 307 | 415 | 383 |
| Cold Tensile Strengths Dwell Time in Seconds | | | | |
| 5 | 438 | 338 | 290 | 327 |
| 10 | 298 | 523 | 563 | 565 |
| 20 | 325 | 500 | 673 | 503 |
| 30 | 310 | 455 | 557 | 518 |
| 40 | 315 | 360 | 510 | 357 |
| 50 | 240 | 368 | 472 | 338 |
| 60 | 285 | 345 | 378 | 360 |

EXAMPLE 3

Example 2 was repeated using the resin of Example 1, except that the catalyst for Tests No. 1 and 2 was prepared from a mixture of 100 parts of the catalyst mixture from Example 2, 15 parts urea and 2 parts hexamethylenetetramine. The catalyst for Tests No. 3, 4 and 5 was the same as in Example 2.

| TEST NO. | 1 | 2 | 3 | 4 | 5 |
|---|---|---|---|---|---|
| Wedrom Sand 5010 (parts by weight) | 100 | 100 | 100 | 100 | 100 |
| Catalyst (parts by weight based on 100 parts resin) | 20 | 20 | 20 | 20 | 20 |
| Resin (parts by weight based on weight of sand) | 2 | 2 | 2 | 2 | 2 |
| Content by wt % | 100% resin | 90% resin 10% Terate 203 | 100% resin | 95% resin 5% Terate 203 | 90% resin 10% Terate 203 |
| Hot Tensile Strengths Dwell Time in Seconds | | | | | |
| 30 | 93 | 120 | 93 | 85 | 115 |
| 60 | 192 | 283 | 247 | 260 | 250 |
| Cold Tensile Strengths Dwell Time in Seconds | | | | | |
| 5 | 312 | 303 | 530 | 543 | 570 |
| 10 | 508 | 695 | 242 | 582 | 667 |
| 20 | 475 | 822 | 272 | 562 | 623 |
| 30 | 412 | 668 | 293 | 542 | 667 |
| 40 | 468 | 603 | 308 | 488 | 482 |
| 50 | 418 | 693 | 353 | 468 | 467 |
| 60 | 425 | 510 | 348 | 386 | 548 |

What is claimed is:

1. A thermosetting foundry hot box binder composition comprising a furan resin and an aromatic polyester polyol, said furan resin comprising a reaction product of (1) an acidic condensation product of urea and formaldehyde and (2) furfuryl alcohol and said aromatic polyester polyol comprising a transesterification product of a dialkyl terephthalate and an aliphatic glycol.

2. A thermosetting foundry hot box binder composition according to claim 1 wherein the aromatic polyester polyol is present in amounts up to about 30% by weight based on the weight of the furan resin.

3. A thermosetting foundry hot box binder composition comprising a furan resin and an aromatic polyester polyol, said furan resin comprising a furfural alcohol resin and said aromatic polyester polyol comprising a transesterification product of a dialkyl terephthalate and an aliphatic glycol.

4. A thermosetting foundry hot box binder composition according to claim 3 wherein the aromatic polyester polyol is present in amounts up to about 30% by weight based on the weight of the furan resin.

5. A thermosetting foundry hot box binder composition comprising a furan resin and an aromatic polyester polyol, said furan resin comprising a furfuryl alcohol formaldehyde resin and said aromatic polyester polyol comprising a transesterification product of a dialkyl terephthalate and an aliphatic glycol.

6. A thermosetting foundry hot box binder composition according to claim 5 wherein the aromatic polyester polyol is present in amounts up to about 30% by weight based on the weight of the furan resin.

7. A thermosetting foundry hot box binder composition comprising a furan resin and an aromatic polyester polyol, said furan resin comprising a phenolic formaldehyde furfuryl alcohol resin and said aromatic polyester polyol comprising a transesterification product of a dialkyl terephthalate and an aliphatic glycol.

8. A thermosetting foundry hot box binder composition according to claim 7 wherein the aromatic polyester polyol is present in amounts up to about 30% by weight based on the weight of the furan resin.

9. A method of producing foundry cores or molds comprising mixing sand and from about 0.5% to about 5% by weight based on the weight of the sand of the binder composition of claim 1, molding the mix into the desired shape and causing the resin composition to cure.

10. A method of producing foundry cores or molds comprising mixing sand and from about 0.5% to about 5% by weight based on the weight of the sand of the binder composition of claim 3, molding the mix into the desired shape and causing the resin composition to cure.

11. A method of producing foundry cores or molds comprising mixing sand and from about 0.5% to about 5% by weight based on the weight of the sand of the binder composition of claim 5, molding the mix into the desired shape and causing the resin composition to cure.

12. A method of producing foundry cores or molds comprising mixing sand and from about 0.5% to about 5% by weight based on the weight of the sand of the binder composition of claim 7, molding the mix into the desired shape and causing the resin composition to cure.

* * * * *